US009050226B2

(12) United States Patent
Husted et al.

(10) Patent No.: US 9,050,226 B2
(45) Date of Patent: Jun. 9, 2015

(54) LIGHTWEIGHT FOLDING MOTORIZED CHAIR WITH MECHANICAL TRACTION STEERING AND BRAKING

(71) Applicants: Royce Husted, Forest, VA (US); Joel Husted, Forest, VA (US)

(72) Inventors: Royce Husted, Forest, VA (US); Joel Husted, Forest, VA (US)

( * ) Notice: Subject to any disclaimer, the term of this patent is extended or adjusted under 35 U.S.C. 154(b) by 0 days.

(21) Appl. No.: 14/018,728

(22) Filed: Sep. 5, 2013

(65) Prior Publication Data

US 2015/0060156 A1 Mar. 5, 2015

(51) Int. Cl.

| | |
|---|---|
| ***B62M 1/14*** | (2006.01) |
| ***A61G 5/04*** | (2013.01) |
| ***A61G 5/08*** | (2006.01) |
| *A61G 5/10* | (2006.01) |

(52) U.S. Cl.

CPC *A61G 5/045* (2013.01); *A61G 5/08* (2013.01); *A61G 2005/1051* (2013.01)

(58) Field of Classification Search

USPC ............................ 280/250.1, 304.1, 650, 246

See application file for complete search history.

(56) References Cited

U.S. PATENT DOCUMENTS

| | | | | |
|---|---|---|---|---|
| 2,675,064 | A | 6/1949 | Welsh | |
| 4,736,960 | A * | 4/1988 | Batty et al. | 280/42 |
| 4,786,064 | A | 11/1988 | Baghdasarian | |
| 4,957,303 | A | 9/1990 | Romatz | |
| 5,076,602 | A | 12/1991 | Robertson et al. | |
| 5,209,509 | A | 5/1993 | Gay et al. | |
| 5,244,223 | A * | 9/1993 | Uchiyama | 280/250.1 |
| 5,778,996 | A | 7/1998 | Prior et al. | |
| 6,273,212 | B1 * | 8/2001 | Husted et al. | 180/65.1 |
| 6,371,228 | B1 | 4/2002 | Husted et al. | |
| 6,428,029 | B1 | 8/2002 | Barclay | |
| 7,222,921 | B2 | 5/2007 | Farnella et al. | |
| 7,832,515 | B2 * | 11/2010 | Barthelt | 180/167 |
| 7,845,665 | B2 * | 12/2010 | Borisoff | 280/250.1 |
| 2002/0145271 | A1 * | 10/2002 | Sanchez | 280/658 |
| 2008/0265542 | A1 * | 10/2008 | Chong | 280/250.1 |

FOREIGN PATENT DOCUMENTS

| | | | |
|---|---|---|---|
| EP | 0630634 | A1 | 12/1994 |
| GB | 2485654 | A | 5/2012 |

OTHER PUBLICATIONS

PCT International Search Report and Written Opinion in PCT Appl. No. PCT/US2014/052353, Dec. 2, 2014, 58 pages.

* cited by examiner

*Primary Examiner* — Anne Marie Boehler
*Assistant Examiner* — Marlon Arce
(74) *Attorney, Agent, or Firm* — Brian J. Teague

(57) ABSTRACT

A lightweight folding motorized chair with mechanical traction steering and braking. A folding frame supports the traction wheels and the drive system with hinged frame members configured to mechanically fold the control levers, wheels and periphery components into a substantially flat configuration for easy storage in small spaces. A mix of weight saving choices including: structural materials; mechanical traction control system; lithium ion battery; and overall lightweight design keeps the folding motorized chair at a size and weight that a person can lift into the trunk of a car.

19 Claims, 7 Drawing Sheets

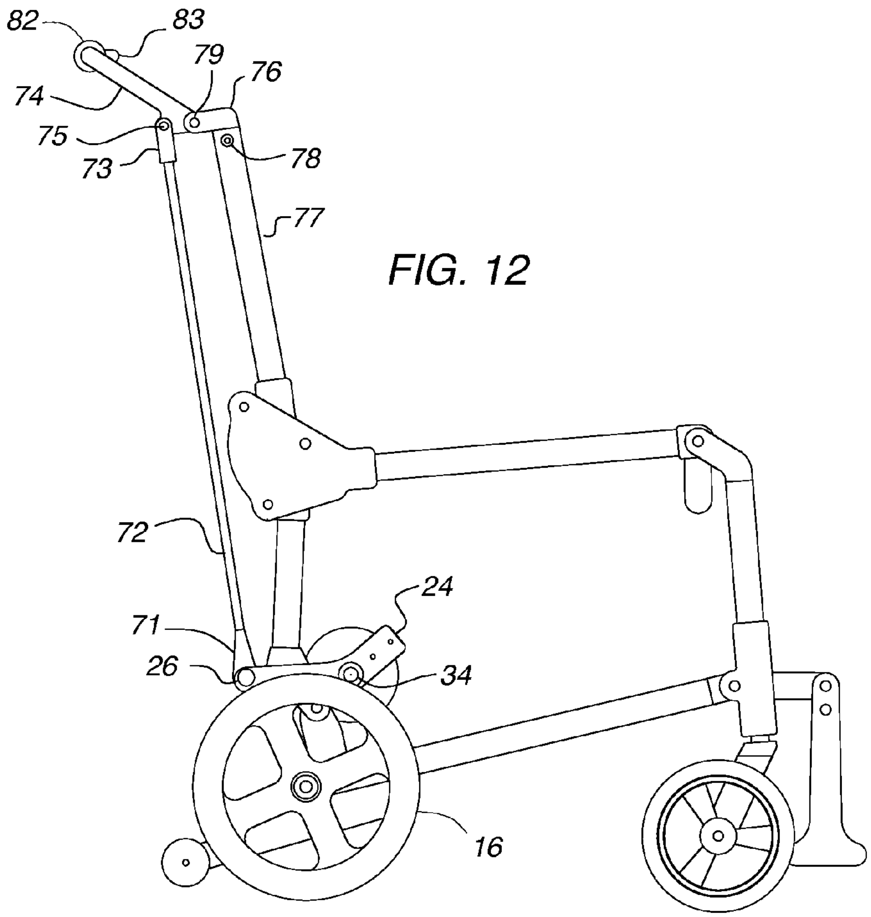
FIG. 12
FIG. 13
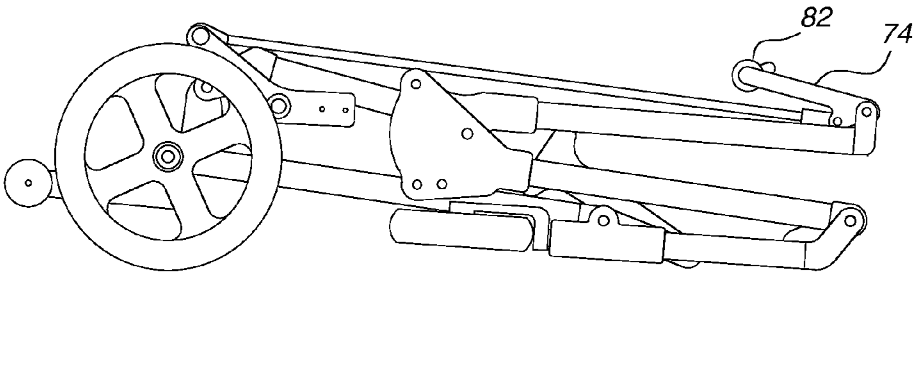

LIGHTWEIGHT FOLDING MOTORIZED CHAIR WITH MECHANICAL TRACTION STEERING AND BRAKING

CROSS-REFERENCE TO RELATED APPLICATIONS

This application is a powered folding chair incorporating a friction driving and braking system described and claimed in U.S. Pat. No. 6,371,228 issued Apr. 16, 2002 and U.S. Pat. No. 6,273,212 issued Aug. 14, 2001, the contents of which are incorporated by reference herein in their entirety.

BACKGROUND OF THE INVENTION

This invention relates generally to vehicles and specifically to a folding motorized chair with mechanical traction control that folds flat and is light enough for a person to lift into the trunk of a car.

Contemporary power chairs may be divided into two categories: those that steer by selectively operated traction wheels and those that steer by turning the front wheel or wheels.

The traction-steered vehicles are commonly referred to as power wheelchairs. They have front casters and are controlled by a single joystick that interacts with a very complicated electronic control system for switching and modulating the requisite high current, low voltage, battery power. Power wheelchairs employ two gear motors to independently and directly drive the left and right traction wheels. These motors in various combinations of power input; propel, steer and brake the vehicle. It should be noted that, due to the requisite high ratio gearing of the vehicle, it is impossible to overdrive the motors (to allow the vehicle to coast) when traveling downhill. This inability to coast reduces its range of travel, particularly in graded or hilly areas. The two gear motors require large and heavy batteries to provide an acceptable range of travel. The excessive weight of power wheelchairs makes it humanly impossible to lift them off the ground so a van equipped with a mechanical lift or a loading ramp is needed to transport them. A further drawback of power wheelchairs is high cost, not only of the vehicle but of the specially equipped van as well.

Power chairs that directly steer a wheel (or a pair of wheels) are commonly referred to as scooters. Most scooters employ a tricycle configuration with steering of the front wheel being accomplished by means of a handlebar. This configuration results in far too large a turning radius for indoor maneuvering. Even in a large indoor area the front upright steering column precludes indoor activities like sitting at a desk or table. Scooters employ a single gear motor that drives the rear wheels through a differential. The differential is subject to traction loss due to split coefficient. This may occur for example, when either drive wheel loses traction on a wet or slippery surface resulting in neither drive wheel being able to provide a driving force. The result is that the vehicle user, who is often incapable of walking or significant unassisted movement, is literally stranded.

Because of their front wheel steering and tricycle configuration, scooters are highly unstable at practically all speeds. A sudden turn of the handlebar will cause the tricycle to tip. The centrifugal force acting on such a high center of gravity vehicle tends to throw the vehicle (and occupant) up onto the front wheel and the outside drive wheel. If the occupant does not immediately steer out of the turn (which is sometimes impossible) a rollover will occur.

The gear motor, differential drive and frame structure needed to support a front handlebar steering system makes the cost and weight only slightly reduced as compared to the joy stick controlled power wheelchairs discussed above. The size and weight of these vehicles is impossible to fit in the trunk of a car. A van equipped with a mechanical lift or loading ramp is needed to transport scooters. A further draw back of the scooters is cost. The sheer size and weight contribute to the cost not only of the scooter but the specially equipped van as well.

There are some scooters of relatively lighter weight but they are still too heavy to be manually lifted and too big to fit in a car trunk. These down-sized scooters have very poor performance and are limited to mild hills and smooth terrain. Some of these scooters can be taken apart by removing the upright steering column, the seat, and finally the battery pack. The components can be loaded into a car trunk piece by piece but assembly in a parking lot is inconvenient and dangerous. The battery pack is the heaviest part that in most cases weighs more than the weight of the present invention in its entirety, battery included.

BRIEF SUMMARY

Embodiments of the present invention provide a folding motorized chair that is light, compact, inexpensive and maneuverable. The folding motorized chair of embodiments of the invention will find ready application as a safe and stable vehicle by persons of all ages (provided that they have the use of both their arms). In its preferred embodiment as depicted in FIG. 1, FIG. 2, and FIG. 3, the present invention offers numerous advantages over the prior art. The folding motorized chair can be used on trails and various unpaved surfaces while maintaining traction and control. The folding motorized chair is highly maneuverable in tight spaces, such as those encountered indoors. Its open front allows a user to sit comfortably at a table or desk. Its freewheeling transmission permits coasting which increases its range. The folding motorized chair folds instantly to fit in the trunk of a small size car. The folding motorized chair is ⅕ the weight of the typical power wheelchairs or scooters described above. At only 36 pounds, an able bodied person can lift the folding motorized chair into a car trunk (without special equipment). The folding motorized chair instantly folds flat for storage in small spaces like closets or car trunks. Its simplicity of design makes it inexpensive to own and operate, and reliable to use.

Propulsion, steering, and braking of the inventive folding motorized chair is provided by selectively engaging the periphery of the rear traction wheels with corresponding motor-driven friction rollers or friction brake surfaces. Engagement between friction rollers or brake surfaces and the traction wheels is controlled by a pair of control levers that the user simply moves down for propulsion and up for braking. Normal turning is accomplished by engaging one friction roller with its corresponding traction wheel. Very tight turns may be made by simultaneously engaging one friction roller with its associated traction wheel and engaging the opposite brake surface with its associated traction wheel. This configuration allows for the tight maneuvering necessary for indoor operation. When both control levers are held down, both friction rollers are engaged with their corresponding traction wheels. This acts like a solid axle delivering torque to each traction wheel directly, unlike the differential drive on the scooters mentioned above. A throttle control mounted at the grip of one of the control levers regulates an electronic speed control to vary the motors speed. While the preferred embodiment incorporates a DC motor, it should be understood that the invention is not to be so limited. A lightweight gasoline or propane engine may offer advantages for an off road sport version of the folding motorized chair.

There is a folding motorized assist chair implementation of the present invention that applies to users incapable of controlling the folding motorized chair themselves. A slight modification permits an assistant to take control with a set of controls handles mounted to the rear seat tubes. These handles are mechanically linked to accomplish the same control inputs as the user operated control levers described above. It takes enormous effort to push a wheelchair through a grassy park, or up a hill, but the folding motorized assist chair does all the work to make these activities as easy for an assistant as walking.

The power wheelchairs and scooters described above weigh from 150 to 300 pounds. To save weight with special lightweight batteries and materials is a waste of money because by design these vehicles are far too heavy to be lifted manually. The folding motorized chair weighs 36 pounds owing to its unique design and lightweight components such as: lithium ion battery, aluminum tubing, plastic components, and a highly efficient traction drive system. The folding motorized chair includes an inventive folding mechanism, including frame members and all periphery components which are mechanically coordinated to fold down and lock in a self-contained flat package that fits in the trunk of a small car.

In one embodiment of the invention, a lightweight folding motorized chair with mechanical traction steering comprises a folding quadrilateral mainframe, a pair of traction wheels, a pair of caster wheels, a driving and braking system, and a left and a right control lever. The folding quadrilateral mainframe folds into a substantially flat grouping of frame members when in a fully folded configuration. The pair of traction wheels is mounted for free rotation near a rear of the folding quadrilateral mainframe. The pair of caster wheels is mounted near a front of the folding quadrilateral mainframe. The driving and braking system are frictionally engageable with one or both of the traction wheels. The left and a right control lever selectively move the driving system and the braking system into engagement with one or both of the traction wheels for tractionally propelling, braking and steering the folding motorized chair.

The folding quadrilateral mainframe may mechanically sequence peripheral components into a substantially flat configuration as the folding quadrilateral mainframe moves into the fully folded configuration. The left and the right control levers may be mechanically sequenced to fold into a substantially flat position relative to the folding quadrilateral mainframe when in the fully folded configuration.

The peripheral components may include a swinging foot platform suspended from the front of the folding quadrilateral mainframe. The swinging foot platform may be adapted to be pushed back by one or more feet of a user entering the chair. The folding mainframe may be mechanically linked to retract the swinging foot platform into a substantially flat position relative to the folding quadrilateral mainframe members when in the fully folded configuration.

The peripheral components may include the pair of caster wheels mounted to lower extensions of the front quadrilateral frame members. The extensions may provide a lever action to retract the set of caster wheels into a flat position relative to the folding quadrilateral mainframe members when in the fully folded configuration.

A set of control levers may be facing rearward for use by an assistant walking behind the folding motorized chair. The set of control levers may be mechanically sequenced to fold into a substantially flat position relative to the folding quadrilateral mainframe when in the fully folded configuration.

The driving and braking system may comprise a motor and one or more friction rollers. The motor may deliver a passive braking effect when the motor is not electrified and the friction rollers are forced into engagement with the peripheral surface of the traction wheels.

In another embodiment of the invention, a foot platform system is suspended at a front of a personal mobility chair. The foot platform system is adapted to be pushed back by one or more body parts of a user as the user enters the chair.

In another embodiment of the invention, a personal mobility chair comprises a frame, two or more wheels rotatably affixed to the frame, a seat supported by the frame, and at least one foot platform suspended from at least one support arm pivotably affixed to the frame such that the foot platform is adapted to selectively pivot from a first position upward and backward to a second position when a force is applied to the at least one foot platform and to selectively pivot from the second position downward and forward to the first position when the force is removed.

The at least one foot platform may comprise one foot platform. The at least one support arm may comprise two support arms. The two support arms may be affixed to the foot platform at opposing ends of the foot platform.

The at least one foot platform may comprise first and second independent foot platforms. The at least one support arm may comprises first and second support arms. The first foot platform may be suspended from the first support arm. The second foot platform may be suspended from the second support arm. The first and second foot platforms may be each independently pivotable between the first position and the second position. The first and second support arms may be pivotably affixed to opposing sides of the frame.

The personal mobility chair may further comprise first and second stop pins. The first stop pin is affixed to a first side of the frame and configured to support the first foot platform in a third position. The second stop pin is affixed to a second side of the frame opposite the first side and configured to support the second foot platform in a fourth position different than the third position, such that first and second foot platforms do not contact each other when the first and second sides of the frame are moved toward each other.

OBJECTS OF THE INVENTION

A principal object of the invention is to provide a novel ultra-light folding motorized chair, which is light enough and small enough to be manually lifted and placed in the trunk of a small car.

Another object of the invention is to provide a novel folding motorized chair with tight turning capability for indoor use.

Another object of the invention is to provide a novel folding motorized chair that is highly reliable and inexpensive.

A still further object of the invention is to provide a motorized assist chair for users incapable of controlling the folding motorized chair themselves.

BRIEF DESCRIPTION OF THE DRAWINGS

These and other objects and advantages of the invention will be apparent upon reading the following description in conjunction with the drawings in which:

FIG. 12 shows the right side elevation of the folding motorized chair of FIG. 11 with walk behind controls installed; and FIG. 13 shows right side elevation of the folding motorized chair of FIG. 11 in the fully folded position with walk behind controls installed.

DETAILED DESCRIPTION OF THE INVENTION

Figure 4:
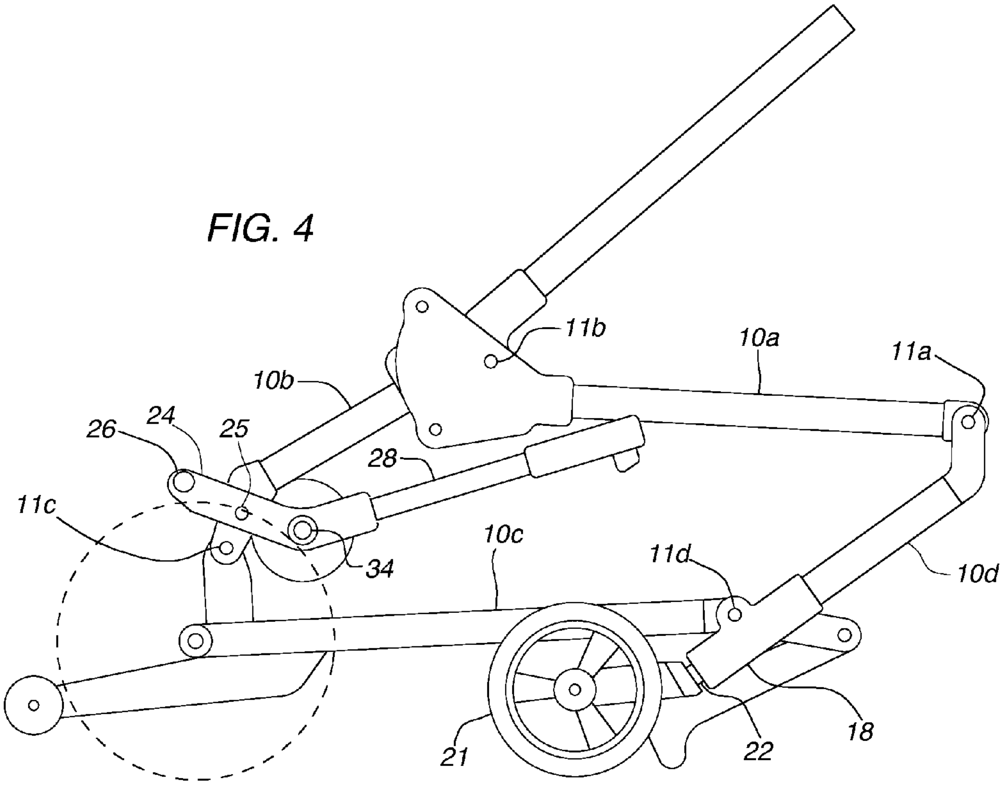
FIG. 4 depicts the folding action of folding motorized chair of FIG. 1 in its mid-folded position.

Components and structure of the left and right side of the folding motorized chair are identical and for this reason only the right side will be described in detail. Referring to the drawings generally and to FIG. 1 in particular a set of three frame members 10*a*, 10*b*, 10*d* are comprised of aluminum tubing with plastic joints of various shapes installed at each end. The frame member 10*c* has a plastic joint at its front end and an aluminum bracket 44 welded at its rear end. Each of four frame members 10*a*, 10*b*, 10*c*, 10*d* is joined by hinge pins 11*a*, 11*b*, 11*c*, 11*d* passing through holes in their respective end joints. These four frame members 10*a*, 10*b*, 10*c*, 10*d* form a quadrilateral mainframe structure. FIG. 4 depicts the folding action of the quadrilateral mainframe in the mid-folded position and FIG. 5 shows the quadrilateral mainframe fully folded.

An axle tube 14 is welded in place at the rear of frame member 10*c*. The axle tube 14 extends beyond the right and left frame members 10*c* to establish the wheelbase for the folding motorized chair. A shoulder bushing (not shown) is pressed into the ends of axle tube 14 to reduce the inner diameter (I.D.) to match the diameter of the wheel axle 15 which extends beyond the axle tube 14 to support a left and right pair of freewheeling traction wheels 16 & 17.

Figure 5:
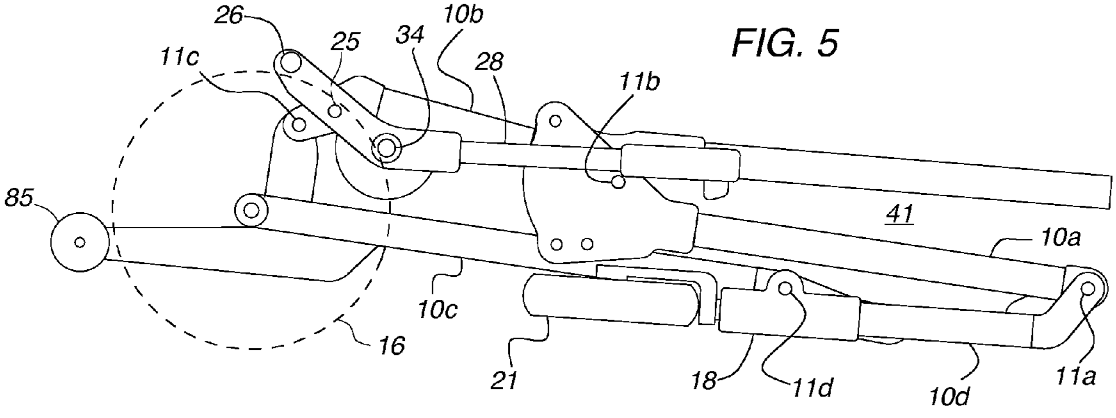
FIG. 5 depicts the folding motorized chair of FIG. 1 in its fully folded position.

Referring to FIGS. 1, 3, 4 & 5, at the lower end of frame member 10*d* the plastic joint 18 extends below the hinge pin 11*d*. A caster wheel 21 has a vertical spindle 22 rotationally housed within the I.D. of the plastic joint 18. FIGS. 4 & 5 show the caster wheel 21 retracting upwards and rotating 90 degrees to a substantially flat position relative to the members of the quadrilateral mainframe structure in the folded condition. An offset arm 20 supports the caster wheel 21 to create a novel caster structure with an open wheel style.

An anti-tip wheel 85 is mounted to a bracket 86 that is welded to the underside of frame member 10*c*. The anti-tip wheel 85 is situated behind the wheel axle 15 and is spaced to never touch ground except in the event of a wheelie. When climbing steep hills a wheelie may occur but the anti-tip wheel 85 stops the chair from flipping over backwards. Note that a skilled user can still steer the traction steered folding motorized chair while riding a wheelie up the hill.

Figure 1:
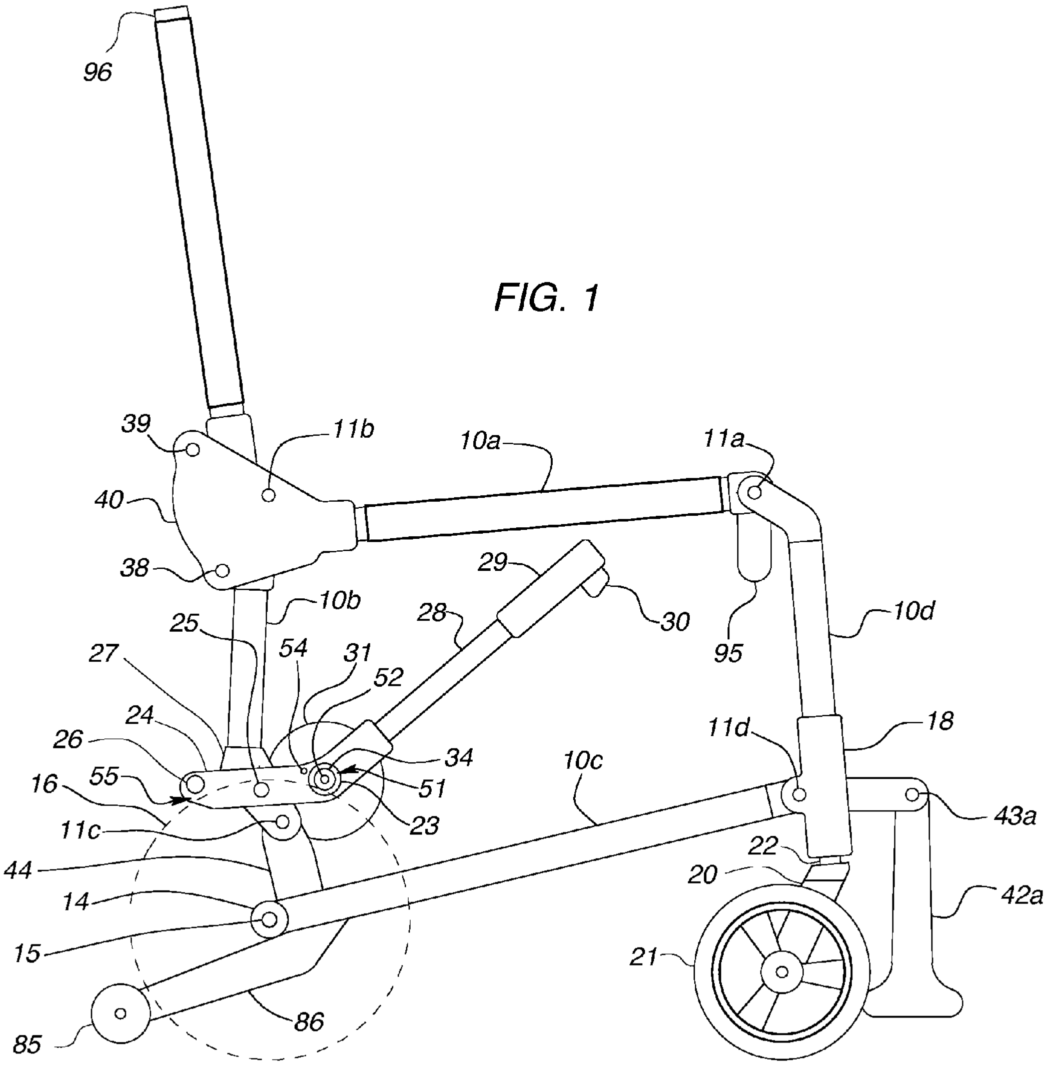
FIG. 1 is a side elevation of a folding motorized chair with the upper portion of the rear traction wheel shown in dashed lines to expose otherwise hidden parts, in accordance with embodiments of the present invention.
Figure 2:
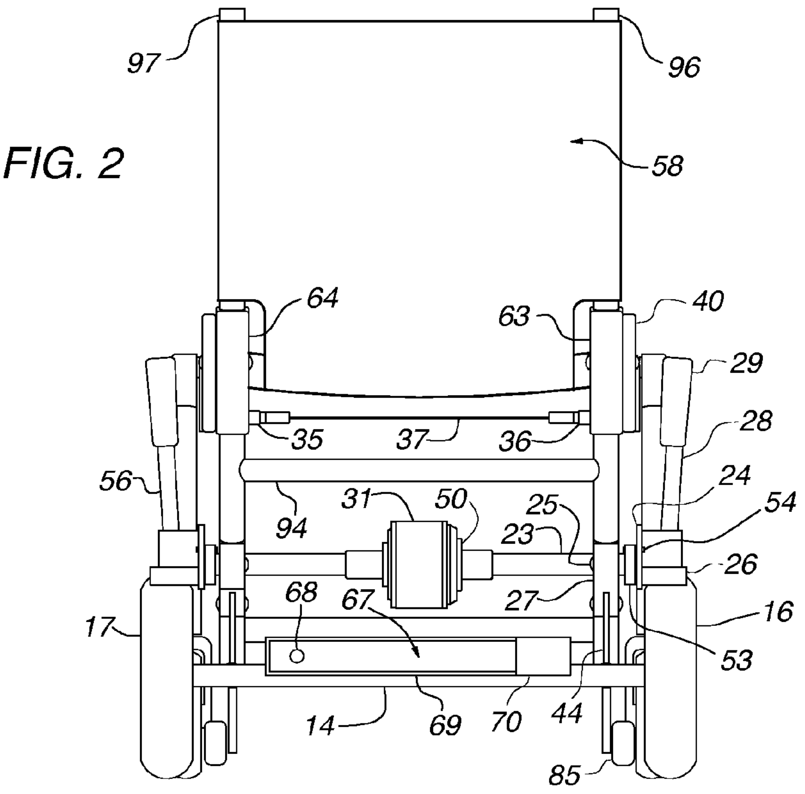
FIG. 2 is a rear elevation of the folding motorized chair of FIG. 1.

The propulsion and breaking control systems for the left and right traction wheels are identical and for this reason only the control system for the right traction wheel 16 will be described in detail. This propulsion and braking system is chosen for ultra-light weight, highly efficient use of energy and it is the only system known to be compatible with the folding mechanics described herein. As best seen in FIGS. 1 & 2, a rocker arm 24 is pivotally supported on an axle 25 that passes through a bushing hole in a plastic joint 27. A brake stud 26 is mounted on the rear of the rocker arm 24. Referring to FIG. 2, a motor 31 is supported on a motor support tube 23. The motor support tube 23 extends out from a flange 50 mounted on the face of the motor 31 and extends through a hole in the rocker arm 24. A locking collar 53 mounted on the motor support tube 23 keeps the horizontal position of the motor 31 and counters the torque of the motor 31 by means of a pin 54 that extends through a hole in the rocker arm 24. The motor 31 has output shaft 52 that passes through the motor support tube 23 and through a ball bearing 51 at the end of the motor support tube 23. A friction roller 34 is mounted at the end of the motor output shaft 52. A control lever 28 is mounted to rocker arm 24 with a handgrip 29 slid over its end. A trigger throttle 30 is installed at the end of the handgrip 29 for controlling the speed of the motor 31.

Referring to FIG. 1 in the normal condition the weight of the motor 31 keeps the friction roller 34 lightly engaged with the peripheral surface of the traction wheel 16, whereas the brake stud 26 is held off the radial periphery of traction wheel 16 by a small space 55. When the control handle 28 is pushed down the friction roller 34 firmly engages the peripheral surface of traction wheel 16 and when the throttle 30 is depressed the traction wheel 16 propels the folding motorized chair in a forward direction. When the control lever 28 is pulled up the friction roller 34 disengages with the peripheral surface of traction wheel 16 and the brake stud 26 engages with the peripheral surface of traction wheel 16. Thus operation of the control lever 28 controls the propulsion and braking of traction wheel 16. Similarly, down and up movements of the opposite control lever 56 results in propulsion and braking of traction wheel 17. For straight-ahead movement of the powered vehicle, both control levers 28 and 56 are pushed down. For turns, only one of the control levers is pushed down. For sharp turns, the control levers are operated in opposite directions to propel one traction wheel and simultaneously brake the other traction wheel. The folding motorized chair is slowed down or fully stopped by pulling up on both control levers. Coasting is accomplished by lifting slightly on each control lever to permit the traction wheels to freewheel for coasting.

When the folding motorized chair is unoccupied the weight of the motor 31 forces the friction rollers 34 into engagement with the peripheral surface of the traction wheels 16 & 17. The ratio between peripheral surface of the traction wheels 16 & 17 and the small diameter friction roller is so high that the permanent magnet motor delivers braking effect that is ideal for this application. The motor's magnetic resistance holds the folding motorized chair in place while at rest but yields to a person pushing. The motor 31 delivers almost no braking effect once the chair is pushed at a stable speed but as soon as the pushing force stops the motor 31 delivers a magnetic breaking effect that slows the chair down to a full stop. This passive braking effect keeps the folding motorized chair from coasting off when the user inadvertently releases it on a hill. This passive braking effect precludes the need of a manual parking brake.

The throttle 30 controls speed from very slow up to a speed of roughly 6 miles per hour (MPH). A throttle limiter is anticipated to keep the speed at a very slow speed during the learning curve. This gives a user reflex time to learn the technique of controlling a new type of vehicle. Once confidence is achieved the throttle limiter can be removed. A switch mounted by the throttle grip for selecting between turtle for indoor use and rabbit for outdoor use is also anticipated, thereby providing two different speeds at any given throttle position depending on the position of the switch.

FIG. 5 depicts the folding motorized chair in its fully folded condition. It can be seen that the mechanics of the quadrilateral mainframe system results in a flat folded condition of all the frame members 10*a*, 10*b*, 10*c*, 10*d*. The control lever 28 however, requires a separate mechanism to join the flat grouping of folded frame members. In FIG. 1 the hinge pin 11*c* and the axle 25 are shown in the ready for use position. FIGS. 4 & 5 depict the mechanical progression as the rocker arm 24 moves on the axle 25 around the hinge point 11*c*. The brake stud 26 and a friction roller 34 are guided by the surface of the traction wheel 16, forcing the control lever 28 into a parallel position with the rest of the frame components. It is this mechanical interplay that permits control levers 28 & 56 to sequentially fold into the flat grouping of components as in shown FIG. 5.

Figure 6:
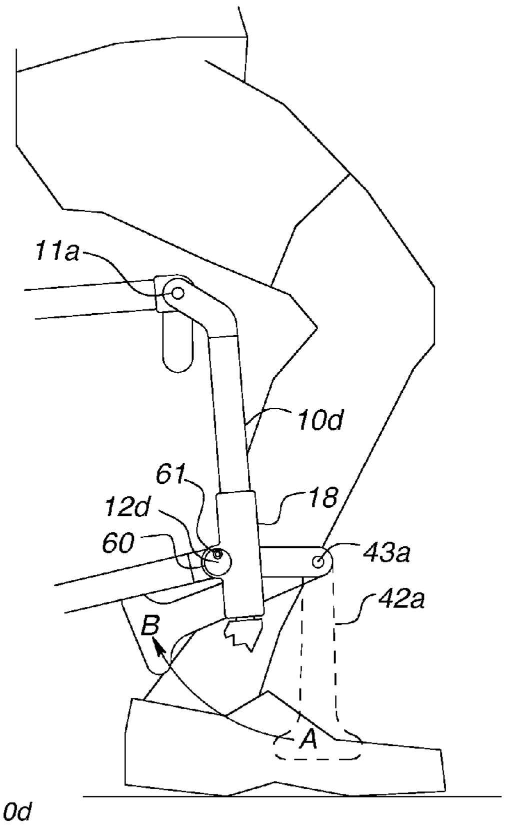
FIG. 6 shows the right front of the folding motorized chair of FIG. 1, with the caster wheel and the lower portion of the caster arm removed to allow a clear view of the front foot platform arm (shown as a dashed line in position A and as a solid line in position B) as pushed rearward by the rear of a man's foot.
Figure 7:
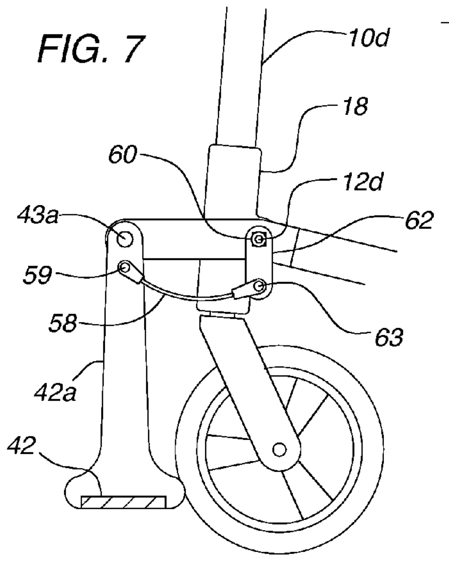
FIG. 7 shows the left front of the folding motorized chair of FIG. 1 as viewed from the interior side and with the foot platform shown in cross section.
Figure 8:
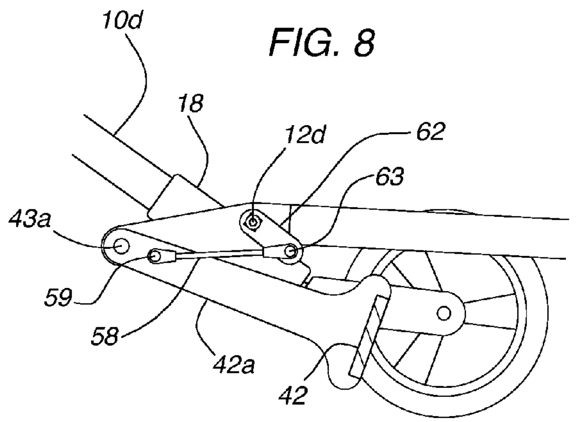
FIG. 8 shows the left front of the folding motorized chair of FIG. 1 as viewed from the interior and with the chair in the mid-folded position and with the foot platform shown in cross section.

Most manual and power wheelchairs have left & right foot platforms which fold independently. They must be lifted up for entering the chair and deliberately pushed back down once seated and finally lifted back up to exit the chair. Referring to FIGS. 6-8, the folding motorized chair incorporates a foot platform 42 that is safer and more convenient than existing designs. The foot platform 42 is suspended from hinge points 43*a* and 43*b* (seen in FIG. 3) by a left & right pair of arms, 42*a* & 42*b* (seen in FIG. 3). FIG. 6 shows the foot platform arm 42*a* (shown in dashed lines) in its normal position labeled A, where it is free to swing backwards to position B. This arrangement allows the user to push the foot platform 42 back with his/her heel toward position B in preparation to sit down. This arrangement lets the user locate his/her feet beneath the center of his/her body to enhance balance when sitting down. After sitting down, the user moves his/her feet forward to allow the foot platform 42 to return to position A, at which time the user may lift his/her feet and place them on the foot platform 42. As with the control lever 28 described above, the swinging foot platform 42 is stored in an unobtrusive position when the folding motorized chair is fully folded. FIGS. 6, 7, 8 depict a retraction system that accomplishes this automatically. Referring to FIG. 6, hinge pin 12*d* has a wide headed hinge pin 60 with an offset hole. A screw 61 passes through the offset hole in hinge pin 60 and threads into plastic joint 18. Referring to FIGS. 7 & 8, hinge pin 12*d* is keyed to a lever arm 62 and rotates with plastic joint 18 during the folding process. A cable 58 with flat eyelets swaged to each end attaches to lever 62 at a pivot point 63 and a pivot point 59 at the top of the foot platform arm 42*a*. When the folding process starts, as depicted in its mid-folded position in FIG. 8, the rotation of lever arm 62 causes the cable 58 to tug on pivot point 59 and progressively draw the foot platform 42 into its unobtrusive stored position. It is this mechanical interplay that permits the foot platform 42 to sequentially fold into the flat grouping of components as shown in FIG. 5.

Figure 9:
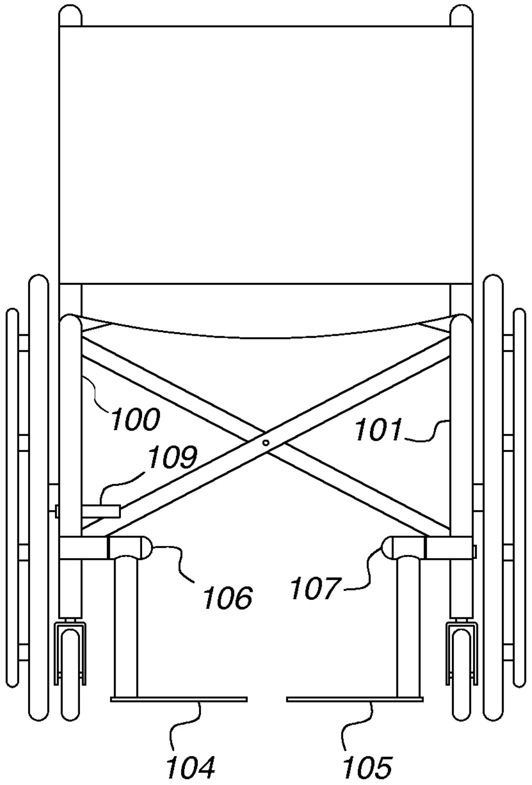
FIG. 9 shows the front elevation of a standard wheelchair with a frame that folds the right side against the left side and with a set of novel swinging foot platforms installed, in accordance with alternative embodiments of the present invention.
Figure 10:
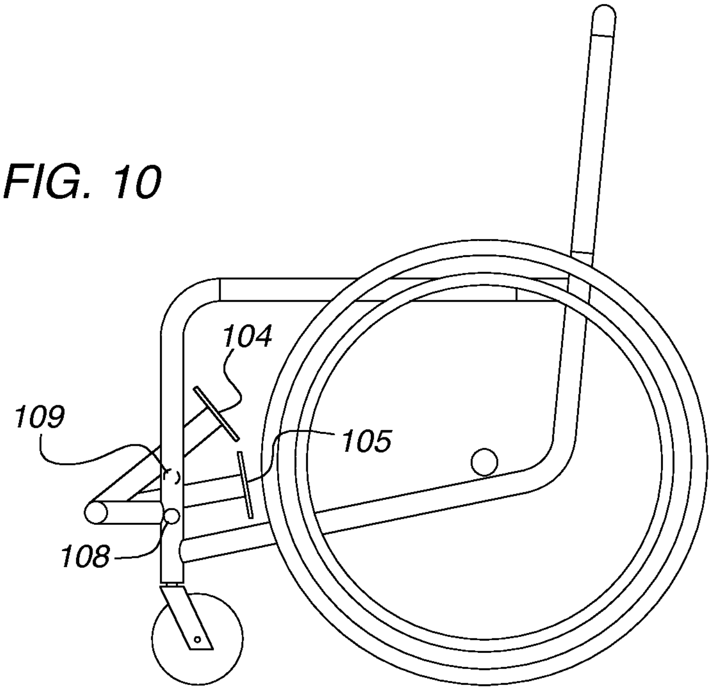
FIG. 10 shows the left side elevation of the wheelchair of FIG. 9.

The swinging foot platform 42, shown in FIG. 6 offers significant improvements for the convenience and safety of users of powered or manual wheelchairs in general. FIGS. 9 & 10 show a variation of the swinging foot platform as installed on a common manual wheelchair. Unlike the folding process of the present invention depicted in FIG. 5, this type of wheelchair moves the left side frame 101 against the right side frame 100. Referring to FIG. 9, two swinging foot platforms 104 & 105 are independently suspended from hinge points 106 & 107 respectively. Because the folding process requires the left side frame 101 to move against the right side frame 100 it is necessary for the swinging foot platforms 104 & 105 to clear one another when the folding process occurs. Referring to FIG. 10, this is arranged by placing the swinging foot platform 105 on a stop pin 108 and placing the swinging foot platform 104 on a stop pin 109 (shown as a hidden line). As seen in FIG. 10, stop pin 108 and stop pin 109 are at different vertical heights on their respective side frames, thereby holding the respective foot platforms in different positions. (Stop pin 108 is not visible in FIG. 9 because stop pin 108 is at a same vertical height as hinge point 107 and thus stop pin 108 is hidden behind hinge point 107 in FIG. 10.) Held in the different positions as shown in FIG. 10, the foot platforms 104 & 105 can clear each other as left side frame 101 and right side frame 100 move toward each other to permit the left and right frames to fold together. What is described above is one example of a functional installation of swinging foot platforms of embodiments of the invention in one type of conventional wheelchair. There are many existing types of wheelchairs that could receive an installation of swinging foot platforms of embodiments of the invention. It is also very easy to include swinging foot platforms of embodiments of the invention in new wheelchair designs and the folding power chair of the present invention is a good example.

Referring again to FIG. 2, the folding motorized chair is locked in its ready for use position by a spring pin 35 and a spring pin 36. The spring pins 35 & 36 are held opposite each other within the plastic joints 63 & 64. A release cable 37 attaches between the spring pins 35 & 36. As best seen in FIG. 1, a plastic joint 40 includes a fan shaped surface having a locking hole 38 and a locking hole 39. The spring pin 36 pops into locking holes 38 & 39 when the fully folded position or ready for use positions, respectively, are reached. When the release cable 37 is pulled, both spring pins 35 & 36 are drawn out of the locking holes 38 & 39 to permit folding or unfolding, respectively.

Figure 3:
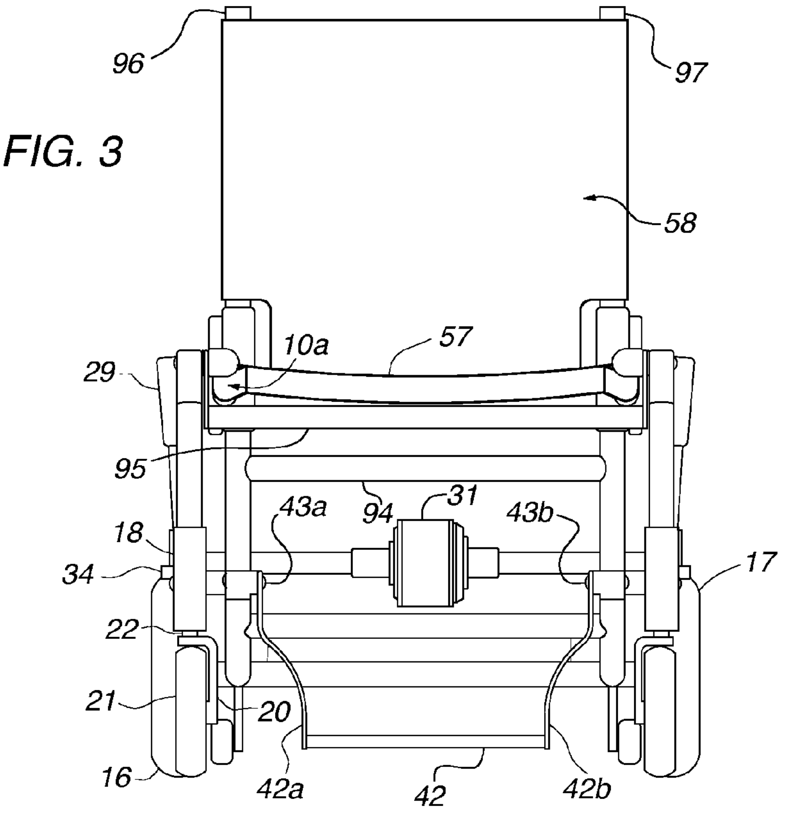
FIG. 3 is a front elevation of the folding motorized chair of FIG. 1.

FIG. 3 shows a heavy canvas seat 57 suspended between right frame member 10*a* and its opposing left frame member. The weight of the user on the canvas seat 57 tends to draw the right frame member 10*a* and the left frame member together. As such, the right frame member 10*a* and the left frame member are held apart at the rear by a cross beam 94 and at the front by an offset cross beam 95. A heavy canvas seat back 58 is suspended between two upright tubes 96 & 97 (which may be substantially vertical or angled back as illustrated). These canvas seats can be backed with padded covers that fit within the open gap 41 designed into the folded frame as shown in FIG. 5.

FIG. 2 shows a battery pack 67 mounted to the axle tube 14. A release button 68 unlatches the battery from a battery holder 69 for easy battery changing. An electronic speed controller is housed in a sealed compartment 70 at the end of the battery holder 69. The battery of choice is a lithium ion battery that weighs only 2.5 pounds and delivers a range of 8 miles. While a lithium ion battery is very expensive (compared to a lead acid battery), a lithium ion battery contributes enormously to the compact size and light weight of the folding motorized chair.

Figure 11:
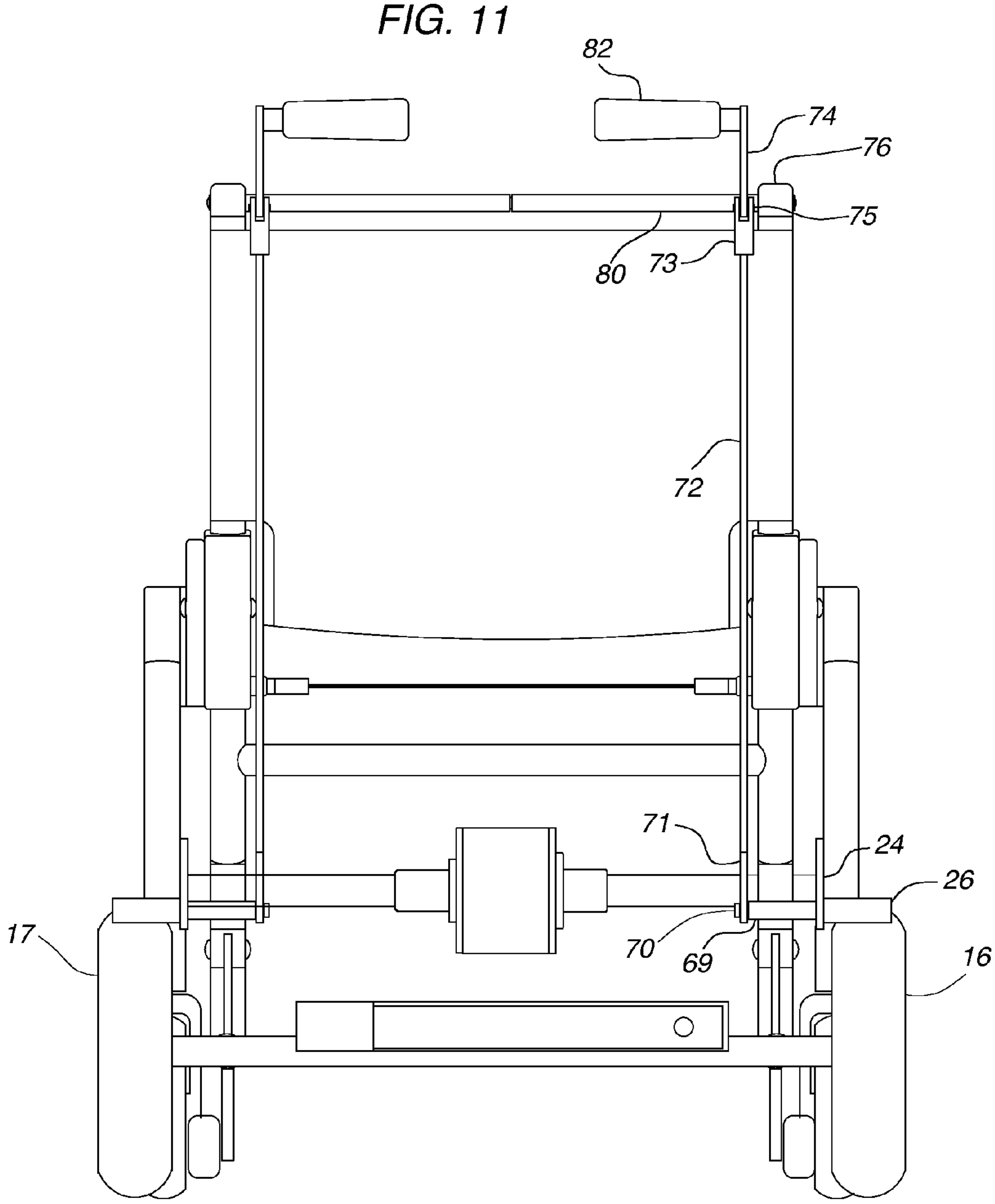
FIG. 11 shows the rear elevation of a folding motorized chair with walk behind controls installed, in accordance with alternative embodiments of the present invention.

The arrangement shown in FIGS. 11, 12 & 13 applies to users incapable of controlling the folding motorized chair themselves. This makes it possible for an assistant to effortlessly walk behind while the assistant steers, brakes, and propels the folding motorized chair. FIGS. 11, 12 & 13 show the folding motorized chair with walk behind control handles installed. The left side and right side are identical so only the right side will be described. First, the original control lever is removed from the rocker arm 24. The brake stud 26 and an extension pin 69 tighten against the rocker arm 24 with a bolt 70 that extends through the extension pin and threads into the brake pin 26. The bolt 70 has a spacer bushing under its head to permit an eye fitting 71 to swivel under the head of bolt 70. A rigid control rod 72 is welded between the eye fitting 71 and a clevis 73. A plastic fitting 76 extends into the I.D. of seat back tube 77 and is held in place by a screw 78. A control lever 74 is welded to a bushing tube 80. An axle 79 extends through the plastic fitting 76, through the bushing tube 80 and on through all the left hand components. The clevis 73 is affixed to the control lever 74 at pivot point 75. A control handle 82 is attached to the control lever 74. A throttle 83 is installed in the grip for controlling motor speed. Control of steering, propulsion and breaking is done similarly to the standard control lever 28 installed, as described above. When the assistant lifts up on control handle 82, the friction roller 34 firmly engages the peripheral surface of traction wheel 16 and when the throttle 83 is depressed the traction wheel 16 propels the folding motorized chair in a forward direction. When the assistant pushes down on the control handle 82, the friction roller 34 disengages with the peripheral surface of traction wheel 16 and the brake stud 26 engages with the peripheral surface of traction wheel 16. Thus operation of the control handle 82 controls the propulsion and braking of traction wheel 16. Similarly, down and up movements of the opposite control handle results in propulsion and braking of traction wheel 17. FIG. 13 shows the folding motorized chair in the fully folded condition. The same mechanical process as described for the standard control levers above, applies for the walk behind control handles. As shown in FIG. 13, the handles rotate into an unobtrusive position that allows the folded chair to fit into the trunk of most cars.

What has been described is a novel lightweight folding motorized chair that is highly maneuverable. It is recognized that numerous changes to the described embodiment of the invention will be apparent to those skilled in the art without departing from its true spirit and scope. The invention is to be limited only as defined in the claims.

What is claimed is:

1. A lightweight folding motorized chair with mechanical traction steering comprising:

a folding quadrilateral mainframe that folds into a substantially flat grouping of frame members when in a fully folded configuration;

a pair of traction wheels mounted for free rotation near a rear of the folding quadrilateral mainframe;

a pair of caster wheels mounted near a front of the folding quadrilateral mainframe;

a driving and braking system frictionally engageable with one or both of the traction wheels;

a left and a right control lever for selectively moving the driving system and the braking system into engagement with one or both of the traction wheels for tractionally propelling, braking and steering the folding motorized chair; and wherein the left and the right control levers are mechanically sequenced, by the folding of the quadrilateral mainframe, to fold into a substantially flat position relative to the folding quadrilateral mainframe when in the fully folded configuration.

2. The lightweight folding motorized chair of claim 1, wherein the folding quadrilateral mainframe mechanically sequences peripheral components into a substantially flat configuration as the folding quadrilateral mainframe moves into the fully folded configuration.

3. The lightweight folding motorized chair of claim 2, wherein the peripheral components include a swinging foot platform suspended from the front of the folding quadrilateral mainframe; wherein the swinging foot platform is adapted to be pushed back by one or more feet of a user entering the chair.

4. The lightweight folding motorized chair of claim 3, wherein the folding mainframe is mechanically linked to retract the swinging foot platform into a substantially flat position relative to the folding quadrilateral mainframe members when in the fully folded configuration.

5. The lightweight folding motorized chair of claim 2, wherein the peripheral components include the pair of caster wheels mounted to lower extensions of the front quadrilateral frame members, and with the extensions providing a lever action to retract the set of caster wheels into a flat position relative to the folding quadrilateral mainframe members when in the fully folded configuration.

6. The lightweight folding motorized chair of claim 1, wherein the left control lever and the right control lever face rearward for use by an assistant walking behind the folding motorized chair.

7. The lightweight folding motorized chair of claim 6, wherein the rearward facing control levers are mechanically sequenced to fold into a substantially flat position relative to the folding quadrilateral mainframe when in the fully folded configuration.

8. The lightweight folding motorized chair of claim 1, wherein the driving and braking system comprises a motor and one or more friction rollers; wherein the motor delivers a passive braking effect when the motor is not electrified and the friction rollers are forced into engagement with a peripheral surface of the traction wheels.

9. A lightweight folding motorized chair with mechanical traction steering comprising:

a folding quadrilateral mainframe that folds into a substantially flat grouping of frame members when in a fully folded configuration;

a pair of traction wheels mounted for free rotation near a rear of the folding quadrilateral mainframe;

a pair of caster wheels mounted near a front of the folding quadrilateral mainframe;

a driving and braking system frictionally engageable with one or both of the traction wheels; and a left and a right control lever for selectively moving the driving system and the braking system into engagement with one or both of the traction wheels for tractionally propelling, braking and steering the folding motorized chair;

wherein the folding quadrilateral mainframe mechanically sequences peripheral components into a substantially flat configuration as the folding quadrilateral mainframe moves into the fully folded configuration;

wherein the peripheral components include the pair of caster wheels mounted to lower extensions of the front quadrilateral frame members, and with the extensions providing a lever action to retract the set of caster wheels into a flat position relative to the folding quadrilateral mainframe members when in the fully folded configuration; and wherein the left and the right control levers are mechanically sequenced, by the folding of the quadrilateral mainframe, to fold into a substantially flat position relative to the folding quadrilateral mainframe when in the fully folded configuration.

10. The lightweight folding motorized chair of claim 9, wherein the peripheral components include a swinging foot platform suspended from the front of the folding quadrilateral mainframe; wherein the swinging foot platform is adapted to be pushed back by one or more feet of a user entering the chair.

11. The lightweight folding motorized chair of claim 10, wherein the folding mainframe is mechanically linked to retract the swinging foot platform into a substantially flat position relative to the folding quadrilateral mainframe members when in the fully folded configuration.

12. The lightweight folding motorized chair of claim 9, wherein the left control lever and the right control lever face rearward for use by an assistant walking behind the folding motorized chair.

13. The lightweight folding motorized chair of claim 12, wherein the rearward facing control levers are mechanically sequenced to fold into a substantially flat position relative to the folding quadrilateral mainframe when in the fully folded configuration.

14. The lightweight folding motorized chair of claim 9, wherein the driving and braking system comprises a motor and one or more friction rollers; wherein the motor delivers a passive braking effect when the motor is not electrified and the friction rollers are forced into engagement with a peripheral surface of the traction wheels.

15. A lightweight folding motorized chair with mechanical traction steering comprising:

a folding quadrilateral mainframe that folds into a substantially flat grouping of frame members when in a fully folded configuration;

a pair of traction wheels mounted for free rotation near a rear of the folding quadrilateral mainframe;

a pair of caster wheels mounted near a front of the folding quadrilateral mainframe;

a driving and braking system frictionally engageable with one or both of the traction wheels; and a left and a right control lever for selectively moving the driving system and the braking system into engagement with one or both of the traction wheels for tractionally propelling, braking and steering the folding motorized chair;

wherein the left control lever and the right control lever face rearward for use by an assistant walking behind the folding motorized chair; and wherein the rearward facing control levers are mechanically sequenced to fold into a substantially flat position relative to the folding quadrilateral mainframe when in the fully folded configuration.

16. The lightweight folding motorized chair of claim 15, wherein the folding quadrilateral mainframe mechanically sequences peripheral components into a substantially flat configuration as the folding quadrilateral mainframe moves into the fully folded configuration.

17. The lightweight folding motorized chair of claim 16, wherein the peripheral components include a swinging foot platform suspended from the front of the folding quadrilateral mainframe; wherein the swinging foot platform is adapted to be pushed back by one or more feet of a user entering the chair.

18. The lightweight folding motorized chair of claim 17, wherein the folding mainframe is mechanically linked to retract the swinging foot platform into a substantially flat position relative to the folding quadrilateral mainframe members when in the fully folded configuration.

19. The lightweight folding motorized chair of claim 15, wherein the driving and braking system comprises a motor and one or more friction rollers; wherein the motor delivers a passive braking effect when the motor is not electrified and the friction rollers are forced into engagement with a peripheral surface of the traction wheels.

* * * * *